US012758464B1

(12) United States Patent
Cun

(10) Patent No.: US 12,758,464 B1
(45) Date of Patent: Oct. 13, 2026

(54) SWING ASSEMBLY AND A MASSAGER THEREOF

(71) Applicants: Shenzhen Envision Technology Innovation Co., Ltd., Shenzhen (CN); Dongguan Beige Electronic Industry Co., Ltd., Shenzhen (CN)

(72) Inventor: Lang Cun, Shenzhen (CN)

( * ) Notice: Subject to any disclaimer, the term of this patent is extended or adjusted under 35 U.S.C. 154(b) by 0 days.

(21) Appl. No.: 19/188,984

(22) Filed: Apr. 24, 2025

(51) Int. Cl.
*A61H 23/00* (2006.01)
*A61H 23/02* (2006.01)

(52) U.S. Cl.
CPC ....... *A61H 23/006* (2013.01); *A61H 23/0254* (2013.01); *A61H 2201/1669* (2013.01)

(58) Field of Classification Search
CPC ............................ A61H 23/06; A61H 23/0254
See application file for complete search history.

(56) References Cited

U.S. PATENT DOCUMENTS

| | | | | |
|---|---|---|---|---|
| 12,023,295 | B2 | 7/2024 | Chen | |
| 12,127,992 | B1 * | 10/2024 | Luo | A61H 23/04 |
| 12,208,053 | B1 * | 1/2025 | Liu | A61H 23/006 |
| 2017/0326022 | A1 * | 11/2017 | Fima | A61H 19/44 |
| 2023/0172793 | A1 * | 6/2023 | Witt | A61H 19/34 600/38 |
| 2024/0358588 | A1 * | 10/2024 | Liu | A61H 23/0263 |

* cited by examiner

*Primary Examiner* — LaToya M Louis
(74) *Attorney, Agent, or Firm* — Tsz Lung Yeung

(57) ABSTRACT

A novel swing assembly includes an outer housing, a driving motor, and a movable swing arm; a housing accommodating cavity is formed inside the outer housing, and the driving motor is fixedly installed in the housing accommodating cavity; the movable swing arm includes a first end and a second end, the first end is provided outside the outer housing, the second end is rotatably pivoted to the outer housing and disposed in the housing accommodating cavity; a rotating member is provided between the driving motor and the second end, the rotating member is connected to the power output shaft of the driving motor, a spherical groove is provided on the surface of the rotating member facing the movable swing arm, and the spherical groove deviates from the rotation center of the rotating member.

3 Claims, 6 Drawing Sheets

SWING ASSEMBLY AND A MASSAGER THEREOF

FIELD OF THE INVENTION

The present invention relates to the technical field of massage devices, and in particular to a novel swing assembly and a massager thereof.

BACKGROUND OF THE INVENTION

A Chinese invention patent of a pressing and vibrating massage mechanism (Patent number: ZL 202322098776.9), which specifically discloses the following technical solutions: A pressing and vibrating massage mechanism, including a housing, a motor disposed in the housing, a connected transmission assembly driven by the motor, and a pressing and massage assembly is disposed on the transmission assembly; the motor is provided with an output bevel gear, the transmission assembly includes a transmission main shaft, the transmission main shaft is fixedly provided with a driven bevel gear, and the driven bevel gear is meshed with the output bevel gear; a bevel wheel is installed on the transmission main shaft, the bevel wheel includes a wheel body, the wheel body is integrally arranged on a bevel disk, and the bevel disk is integrally connected to a baffle plate; the pressing and massage assembly includes a swing arm, the swing arm is provided with a movable hole, and the movable hole is movably fitted with the wheel body.

When the swing arm of the above-mentioned pressing and vibrating massage mechanism moves, the motor drives the transmission main shaft to rotate through the gear transmission pair composed of the output bevel gear and the driven bevel gear, and then the transmission main shaft drives the bevel wheel to rotate, and the bevel wheel drives the swing arm to swing through the wheel body.

It should be pointed out that the swing arm assembly of the above-mentioned pressing and vibrating massage mechanism has the following problems: specifically, since the motor needs to drive the transmission main shaft to rotate through the gear transmission pair composed of the output bevel gear and the driven bevel gear, and then the transmission main shaft drives the swing arm to swing through the bevel wheel, the structure of the entire swing arm assembly is complex and not compact.

SUMMARY OF THE DISCLOSURE

In view of this, the present invention provides a novel swing assembly with simple structure and good compactness, aiming to solve the problems in the prior art.

Besides, the present invention further provides a novel massager with simple structure and good compactness, aiming to solve the problems in the prior art.

To achieve the above objects, the present invention provides the following technical solutions.

A novel swing assembly includes an outer housing, a driving motor, and a movable swing arm; a housing accommodating cavity is formed inside the outer housing, and the driving motor is fixedly installed in the housing accommodating cavity; the movable swing arm includes a first end and a second end, the first end of the movable swing arm is provided outside the outer housing, the second end of the movable swing arm is rotatably pivoted to the outer housing, and the second end of the movable swing arm is disposed in the housing accommodating cavity; a rotating member is installed between the driving motor and the second end of the movable swing arm, the rotating member is connected to the power output shaft of the driving motor, a spherical groove is provided on the surface of the rotating member facing the movable swing arm, and the spherical groove deviates from the rotation center of the rotating member; a long groove is provided at the second end of the movable swing arm, a spherical body is installed between the rotating member and the second end of the movable swing arm, the part of the spherical body provided on one side of the rotating member is inserted into the spherical groove of the rotating member, and the part of the spherical body provided on one side of the movable swing arm is inserted into the long groove.

In one embodiment, the surface of the rotating member facing the movable swing arm is provided with a concave surface, the second end of the movable swing arm is provided with a convex surface protruding toward the rotating member, the spherical groove is provided on the concave surface, and the long groove is provided on the convex surface; the concave surface of the rotating member is matched with the convex surface of the movable swing arm in a concave-convex manner.

In one embodiment, the second end of the movable swing arm is provided with two coaxially arranged pivots, the left pivot protrudes and extends toward the left side, and the right pivot protrudes and extends toward the right side; the outer housing includes a left housing and a right housing connected to the left housing, and the housing accommodating cavity is surrounded by the left housing and the right housing; the left housing and the right housing are respectively provided with pivot holes, and each pivot is rotatably installed in the pivot hole on the corresponding side.

In one embodiment, the left housing and the right housing are screwed connected.

In one embodiment, the power output shaft of the driving motor is provided with a driving block in the shape of a "cross", the rotating member is provided with a driving groove in the shape of a "cross" which opens toward the driving motor, and the driving block is inserted into the driving groove of the rotating member.

In one embodiment, the housing accommodating cavity is provided with a motor slot, and the driving motor is fixedly installed in the motor slot.

Among them, a massager comprises the above-mentioned novel swing assembly.

Compared with the prior art, the present invention has the following beneficial effects: specifically, when the novel swing assembly of the present invention is in operation, the driving motor drives the rotating member to rotate, and the rotating member drives the second end of the movable swing arm to swing through the spherical body, thereby driving the first end provided outside the outer housing to swing. The driving motor drives the movable swing arm to swing through the rotating member and the spherical body, the overall structure of the novel swing assembly of the present invention is simpler and more compact compared with the prior art. Therefore, the novel swing assembly of the present invention has the advantages of simple structure and good compactness, correspondingly, the massager of the present invention also has the advantages of simple structure and good compactness.

DETAILED DESCRIPTION OF THE PREFERRED EMBODIMENTS

Figure 1:
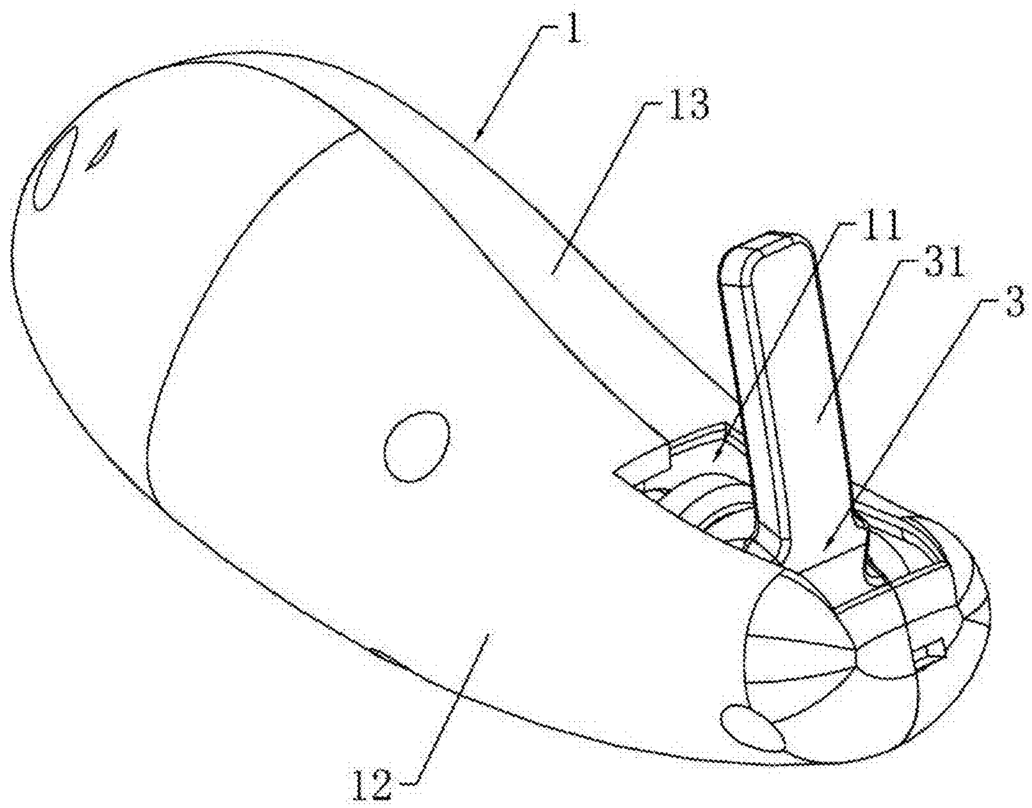
FIG. 1 is a schematic structural view of a massager of the present invention.

Other features, objects and advantages of the present invention will be more clearly and completely by the detailed description of the non-limiting embodiments with reference to the attached drawings (FIG. 1 to FIG. 6). Obviously, the described embodiments are only part of the embodiments of the present invention, but not all of them. Based on the embodiments of the present invention, all other embodiments obtained by ordinary technicians in the field without creative labor are within the scope of the present invention.

Embodiment 1

As shown in FIGS. 1 to 6, a novel swing assembly, comprising an outer housing 1, a driving motor 2, and a movable swing arm 3; a housing accommodating cavity 11 is formed inside the outer housing 1, and the driving motor 2 is fixedly installed in the housing accommodating cavity 11.

As shown in FIGS. 1 to 6, the movable swing arm 3 includes a first end 31 and a second end 32, the first end 31 of the movable swing arm 3 is provided outside the outer housing 1, the second end 32 of the movable swing arm 3 is rotatably pivoted to the outer housing 1, and the second end 32 of the movable swing arm 3 is disposed in the housing accommodating cavity 11.

Furthermore, as shown in FIGS. 2 to 6, a rotating member 4 is provided between the driving motor 2 and the second end 32 of the movable swing arm 3, the rotating member 4 is connected to the power output shaft of the driving motor 2, the rotating member 4 is provided with a spherical groove 41 on the surface facing the movable swing arm 3, and the spherical groove 41 deviates from the rotation center of the rotating member 4.

Furthermore, as shown in FIGS. 2 to 6, a long groove 33 is formed at the second end 32 of the movable swing arm 3, a spherical body 5 is installed between the rotating member 4 and the second end 32 of the movable swing arm 3, the part of the spherical body 5 provided on one side of the rotating member 4 is inserted into the spherical groove 41 of the rotating member 4, and the part of the spherical body 5 provided on one side of the movable swing arm 3 is inserted into the long groove 33.

When the novel swing assembly of the first embodiment is in operation, the driving motor 2 is powered on and started, and the driving motor 2 drives the rotating member 4 to rotate. Based on the deviation of the spherical groove 41 from the rotation axis of the rotating member 4 and the insertion of the spherical body 5 into the spherical groove 41 and the long groove 33 of the movable swing arm 3, during the rotation of the rotating member 4, the rotating member 4 drives the second end 32 of the movable swing arm 3 to swing through the spherical body 5; Based on the integrated structure of the first end 31 and the second end 32 of the movable swing arm 3, the first end 31 provided on the outside of the outer housing 1 swings during the swinging of the second end 32.

It should be emphasized that, in the novel swing assembly of the first embodiment, the driving motor 2 drives the movable swing arm 3 to swing through the rotating member 4 and the spherical body 5. Compared with the prior art, the overall structure of the first embodiment is simpler and more compact.

As can be seen from the structural design above, the novel swing assembly of the first embodiment has the advantages simple structure and good compactness.

Embodiment 2

As shown in FIGS. 3 to 6, the difference between the second embodiment and the first embodiment is that: the surface of the rotating member 4 facing the movable swing arm 3 is provided with a concave surface 42, the second end 32 of the movable swing arm 3 is provided with a convex surface 34 protruding toward the rotating member 4, the spherical groove 41 is provided on the concave surface 42, and the long groove 33 is provided on the convex surface 34; the concave surface 42 of the rotating member 4 is matched with the convex surface 34 of the movable swing arm 3 in a concave-convex manner.

Since the concave surface 42 of the rotating member 4 and the convex surface 34 of the movable swing arm 3 are connected by concave-convex matching, this structural design can make the overall structure of the swing assembly more compact.

Embodiment 3

As shown in FIGS. 2 to 5, the difference between the third embodiment and the first embodiment is that: the second end 32 of the movable swing arm 3 is provided with two coaxially arranged pivots 35, the left pivot 35 protrudes and extends toward the left side, and the right pivot 35 protrudes and extends toward the right side.

Among them, the outer housing 1 includes a left housing 12 and a right housing 13 connected to the left housing 12, and the housing accommodating cavity 11 is surrounded by the left housing 12 and the right housing 13. The left housing 12 and the right housing 13 are respectively provided with pivot holes 14, and each pivot 35 is rotatably installed in the pivot hole 14 on the corresponding side.

It should be noted that the left housing 12 and the right housing 13 are screwed connected.

When the driving motor 2 drives the movable swing arm 3 to swing through the rotating member 4 and the spherical body 5, the movable swing arm 3 takes the position of the pivot 35 as the swing rotation center.

Embodiment 4

Figure 4:
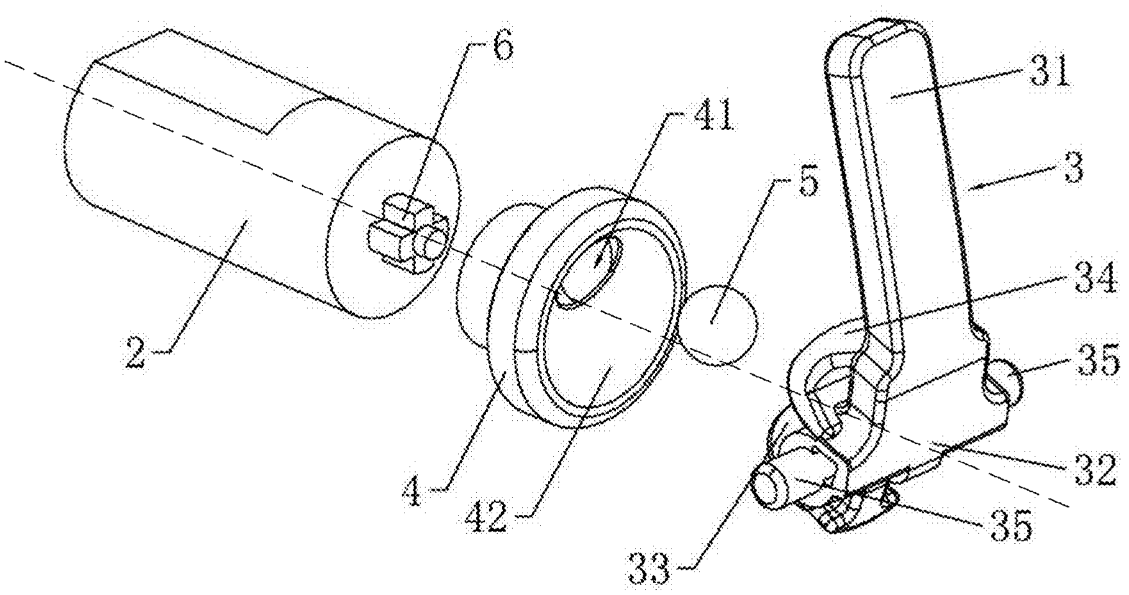
FIG. 4 is an exploded schematic view of the novel swing assembly of the present invention.
Figure 5:
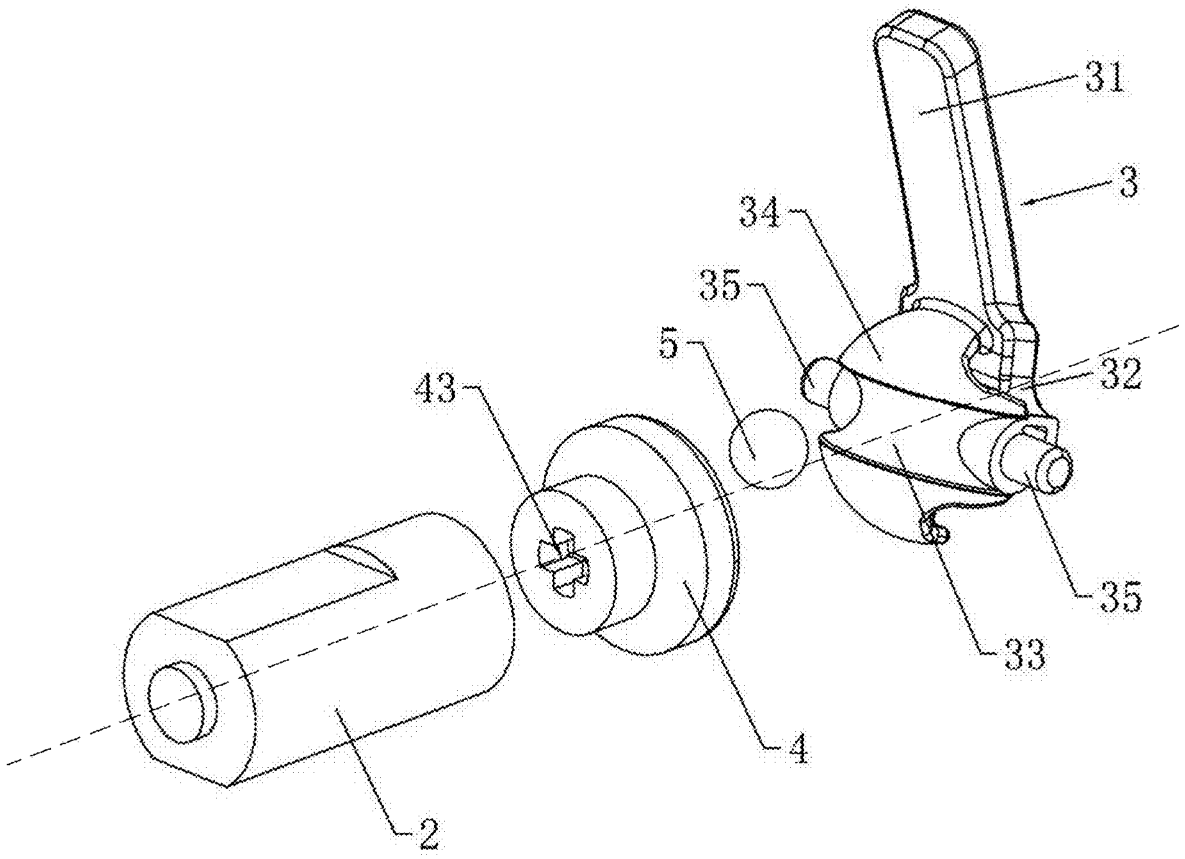
FIG. 5 is an exploded schematic view of the novel swing assembly of the present invention from another perspective.
Figure 6:
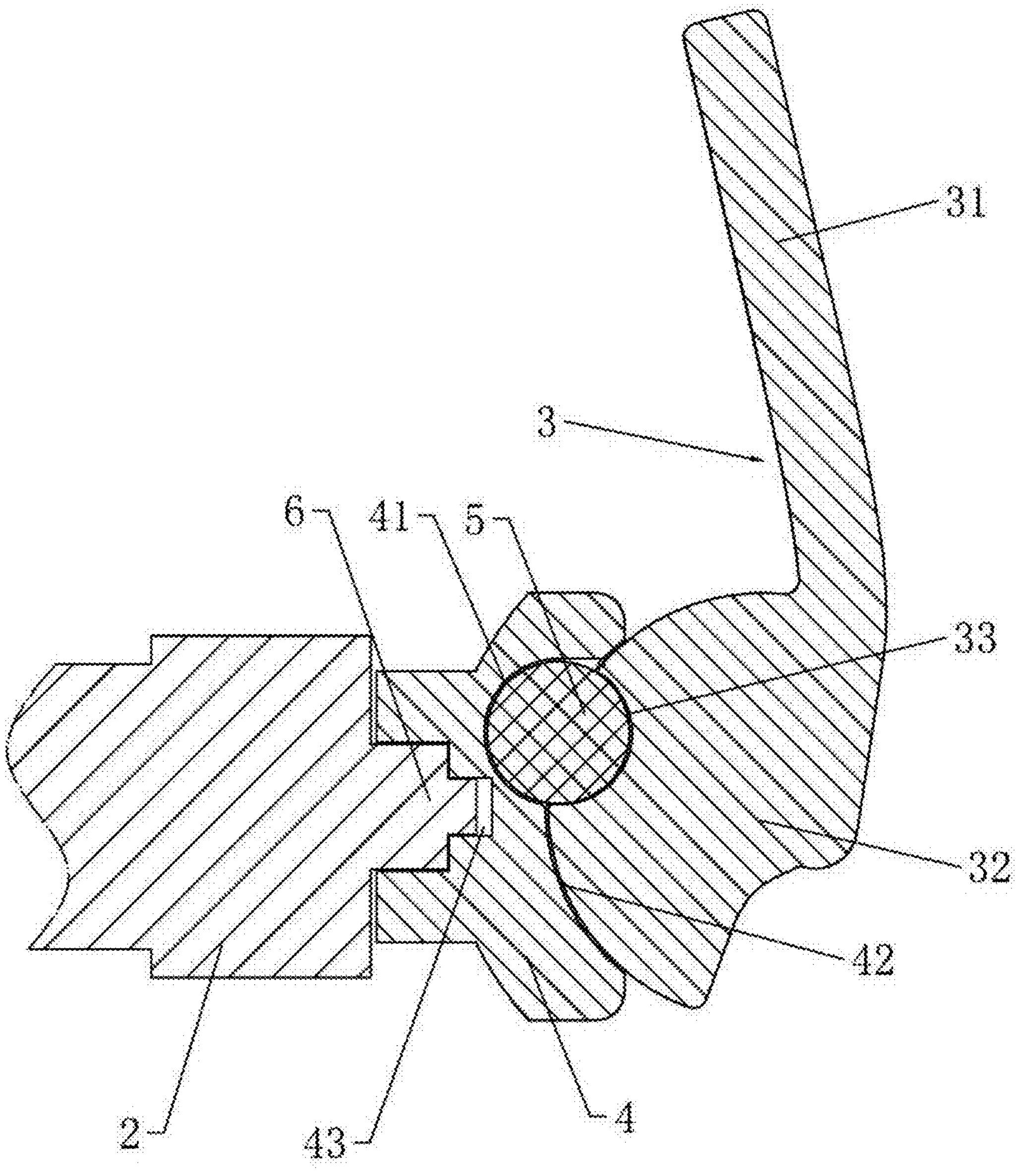
FIG. 6 is a schematic cross-sectional view of the novel swing assembly of the present invention.

As shown in FIGS. 4 to 6, the difference between the fourth embodiment and the first embodiment is that: the power output shaft of the driving motor 2 is provided with a driving block 6 in the shape of a "cross", the rotating member 4 is provided with a driving groove 43 in the shape of a "cross" which opens toward the driving motor 2, and the driving block 6 is inserted in the driving groove 43 of the rotating member 4.

By inserting and connecting the driving blocks 6 in a "cross" shape with the driving groove 43, the novel swing assembly of the fourth embodiment can effectively ensure that the power output shaft of the driving motor 2 drives the rotating member 4 to rotate, and can effectively improve the convenience of assembly.

Embodiment 5

Figure 2:
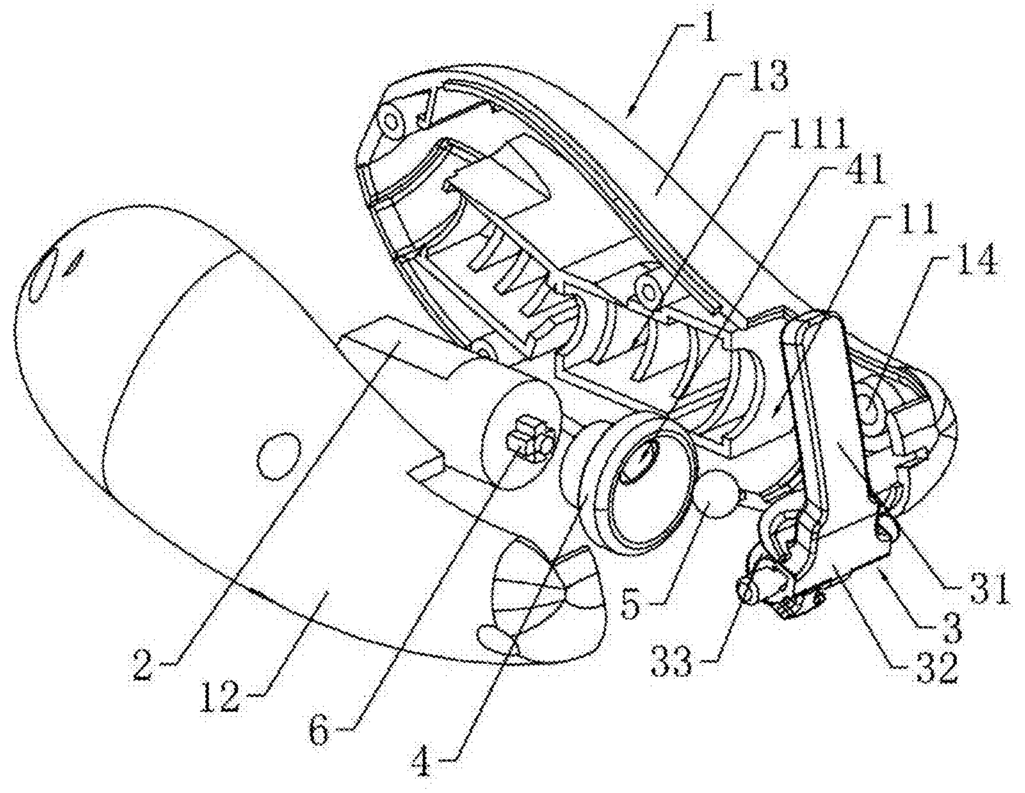
FIG. 2 is an exploded schematic view of FIG. 1.
Figure 3:
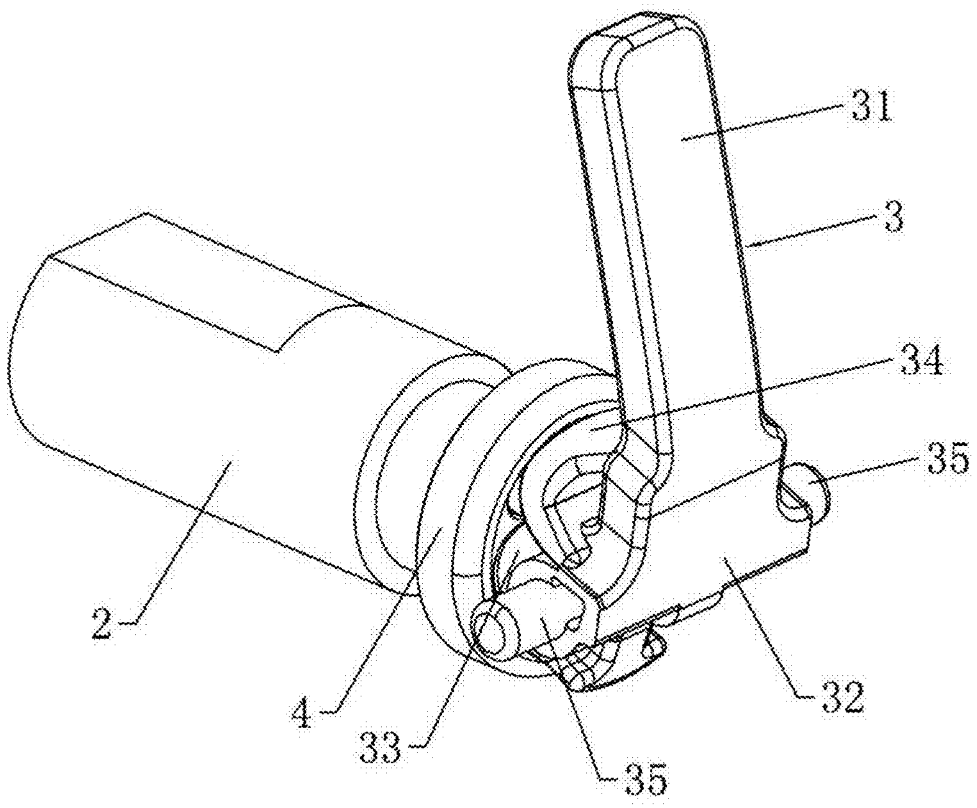
FIG. 3 is a schematic structural view of a novel swing assembly of the present invention.

As shown in FIG. 2, the difference between the fifth embodiment and the first embodiment is that: the housing accommodating cavity 11 is provided with a motor slot 111, and the driving motor 2 is fixedly installed in the motor slot 111.

Embodiment 6

A massager thereof, as shown in FIG. 1 and FIG. 2, includes the above-mentioned novel swing assembly.

Since the above-mentioned novel swing assembly has the advantages of simple structure and good compactness, the massager of the sixth embodiment also has the advantages of simple structure and good compactness correspondingly.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A novel swing assembly, comprising:

an outer housing, a driving motor, and a movable swing arm, a housing accommodating cavity being formed inside the outer housing, the driving motor being fixedly installed in the housing accommodating cavity;

the movable swing arm including a first end and a second end, the first end of the movable swing arm being provided outside the outer housing, the second end of the movable swing arm being rotatably pivoted to the outer housing, the second end of the movable swing arm being disposed in the housing accommodating cavity;

wherein a rotating member is provided between the driving motor and the second end of the movable swing arm, the rotating member being connected to the driving motor, the rotating member being provided with a spherical groove on the surface facing the movable swing arm, the spherical groove deviating from the rotation center of the rotating member; and a long groove being formed at the second end of the movable swing arm, a spherical body being installed between the rotating member and the second end of the movable swing arm, wherein the spherical body on the rotating member is inserted into the spherical groove of the rotating member, and the spherical body on the movable swing arm is inserted into the long groove, wherein the surface of the rotating member facing the movable swing arm is provided with a concave surface, the second end of the movable swing arm is being provided with a convex surface which protrudes toward the rotating member, the spherical groove being provided on the concave surface, and the long groove being provided on the convex surface, the concave surface of the rotating member being matched with the convex surface of the movable swing arm in a concave-convex manner.

2. A novel swing assembly, comprising:

an outer housing, a driving motor, and a movable swing arm, a housing accommodating cavity being formed inside the outer housing, the driving motor being fixedly installed in the housing accommodating cavity;

the movable swing arm including a first end and a second end, the first end of the movable swing arm being provided outside the outer housing, the second end of the movable swing arm being rotatably pivoted to the outer housing, the second end of the movable swing arm being disposed in the housing accommodating cavity;

wherein a rotating member is provided between the driving motor and the second end of the movable swing arm, the rotating member being connected to the driving motor, the rotating member being provided with a spherical groove on the surface facing the movable swing arm, the spherical groove deviating from the rotation center of the rotating member; and a long groove being formed at the second end of the movable swing arm, a spherical body being installed between the rotating member and the second end of the movable swing arm, wherein the spherical body on the rotating member is inserted into the spherical groove of the rotating member, and the spherical body on the movable swing arm is inserted into the long groove, wherein the second end of the movable swing arm being provided with a left pivot and a right pivot coaxially arranged with each other, the left pivot protruding and extending toward a left side, and the right pivot protruding and extending toward a right side, the outer housing including a left housing and a right housing connected to the left housing, the housing accommodating cavity being surrounded by the left housing and the right housing, the left housing and the right housing being respectively provided with pivot holes, each of the pivots being rotatably installed in the pivot hole on the corresponding side.

3. The novel swing assembly according to claim 2, wherein the left housing and the right housing are screwed connected.

* * * * *